United States Patent
Drott et al.

(10) Patent No.: US 7,600,761 B2
(45) Date of Patent: Oct. 13, 2009

(54) SEALING COLLAR

(75) Inventors: Peter Drott, Frankfurt/M (DE); Harald König, Ober-Mörlen (DE); Udo Jungmann, Mörfelden (DE); Andreas Bischoff, Bad Vilbel (DE); Hans-Michael Koppel, Frankfurt/M (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 525 days.

(21) Appl. No.: 10/522,044

(22) PCT Filed: Jul. 29, 2003

(86) PCT No.: PCT/EP03/08363

§ 371 (c)(1),
(2), (4) Date: Jan. 19, 2005

(87) PCT Pub. No.: WO2004/013521

PCT Pub. Date: Feb. 12, 2004

(65) Prior Publication Data

US 2006/0091613 A1 May 4, 2006

(30) Foreign Application Priority Data

Jul. 30, 2002 (DE) .................................. 102 34 542

(51) Int. Cl.
*F16J 9/20* (2006.01)
(52) U.S. Cl. .................................................. 277/436
(58) Field of Classification Search ......... 277/436–439, 277/457, 549, 552, 553, 558
See application file for complete search history.

(56) References Cited

U.S. PATENT DOCUMENTS

| 2,660,493 | A | * | 11/1953 | Flick | 277/436 |
| 2,778,695 | A | * | 1/1957 | Sturtevant | 384/16 |
| 2,844,423 | A | * | 7/1958 | Arnold | 277/436 |
| 2,959,432 | A | * | 11/1960 | Hoyer | 277/356 |
| 3,037,781 | A | * | 6/1962 | Peras | 277/436 |

(Continued)

FOREIGN PATENT DOCUMENTS

DE 884 260 7/1953

(Continued)

OTHER PUBLICATIONS

"Groove." Def. 1. Webster's II New Riverside Dictionary. Office ed. 1996. 3 pages.*

*Primary Examiner*—Jennifer H Gay
*Assistant Examiner*—Gilbert Y Lee
(74) *Attorney, Agent, or Firm*—RatnerPrestia

(57) ABSTRACT

The invention relates to a sealing collar for a cylinder-and-piston unit, wherein the sealing collar is essentially received in a groove that is inserted into the cylinder or the piston, respectively, and the sealing collar comprises two sealing lips, the first sealing lip thereof being acted upon dynamically and making catch at the piston or the cylinder, respectively, while the second sealing lip thereof is acted upon statically and rests on a bottom of the groove.

It is the core of the invention that the sealing collar includes a circumferential extension that extends in parallel to the sealing lips, is arranged radially between the first sealing lip and the second sealing lip and projects from the sealing lips in an axial direction.

1 Claim, 1 Drawing Sheet

U.S. PATENT DOCUMENTS

| | | | | |
|---|---|---|---|---|
| 3,455,562 | A | * | 7/1969 | Burtis .......................... 277/438 |
| 3,913,460 | A | * | 10/1975 | Wright ......................... 92/85 R |
| 4,103,594 | A | * | 8/1978 | Geffroy ......................... 92/159 |
| 4,116,452 | A | * | 9/1978 | Schanz ......................... 277/439 |
| 4,781,024 | A | * | 11/1988 | Nakamura .................... 60/533 |
| 5,328,178 | A | | 7/1994 | Nies |

FOREIGN PATENT DOCUMENTS

| | | |
|---|---|---|
| DE | 1 946 220 | 9/1966 |
| DE | 3607254 C2 | 10/1986 |
| DE | 42 23 671 A1 | 1/1994 |
| DE | 198 12 041 A1 | 10/1999 |
| EP | 0 889 265 A1 | 1/1999 |

* cited by examiner

SEALING COLLAR

TECHNICAL FIELD

The present invention relates to a sealing collar for a cylinder-and-piston unit, wherein the sealing collar is essentially received in a groove that is inserted into the cylinder or the piston, respectively, and the sealing collar comprises two sealing lips, the first sealing lip thereof being acted upon dynamically and making catch at the piston or the cylinder, respectively, while the second sealing lip thereof is acted upon statically and rests on the bottom of the groove.

The objective of sealing collars of this type is to seal a working chamber in relation to the ambience, and the sealing collar can be fitted either to the cylinder or to the piston.

BACKGROUND OF THE INVENTION

EP 0 889 265 A1 discloses a piston seal including an inside sealing lip and an outside sealing lip, with the inside sealing lip being stressed dynamically, while the outside sealing lip is stressed statically. The outward end of the outside sealing lip projects in an axial direction from the outward end of the inside sealing lip. A bead that is used as a support and makes catch at the piston in a radial direction reinforces the prior art sealing collar.

DE 198 12 041 A1 discloses a sealing element for sealing two coaxial surfaces displaceable relative to each other in an axial direction. Said sealing collar comprises an outside and an inside sealing lip abutting radially on the surfaces being sealed. To increase the force by which the sealing lips bear against the surfaces, the sealing lips are interconnected by radial webs.

To enhance the sealing effect it is generally desirable to make the ends of the sealing lips sufficiently elastical because friction can be reduced and the sealing effect can be enhanced hereby. This means that the sealing lips will have a relatively long and small design. However, as the inside sealing lip with its free end reaches into the area of the boundary between the cylinder and the piston and these boundaries move relative each other, there is the risk that the end of the sealing lip is squeezed in the slot between cylinder and piston. This can occur in particular when there is a major pressure gradient between the rear side of the sealing collar and the sides of the sealing collar associated with the sealing lips.

Remedy is taken in providing the sealing lip which is stressed only statically and disposed on the bottom of the groove for accommodating the sealing collar with a relatively stiff design and additionally making the end of this sealing lip project axially over the end of the dynamically stressed sealing lip. The result is a construction similar to the design illustrated in the above-mentioned European patent specification. It is, however, disadvantageous that such a stiff sealing lip provides a reduced sealing effect and does not lend itself to ease of mounting.

BRIEF SUMMARY OF THE INVENTION

In view of the above, an object of the invention is to configure a sealing collar in a fashion allowing the two sealing lips to have a very elastical design, while an additional objective is to prevent that the dynamically stressed sealing lip can be squeezed in the slot between the two surfaces to be sealed and/or the statically stressed sealing lip can be deformed by abutting on the groove wall, its effect being impaired thereby.

This object is achieved in that the sealing collar includes a circumferential extension that extends in parallel to the sealing lips, is arranged radially between the first sealing lip and the second sealing lip and projects from the sealing lips in an axial direction. It is ensured by said extension that the ends of the sealing lips are prevented from getting into contact with the radially extending wall of the groove, and it is furthermore prevented that the dynamically stressed sealing lip can move into the slot between the surfaces being sealed. This is done in that the extension moves into abutment on the wall of the groove and thus keeps the ends of the sealing lips at a distance from this wall and, hence, from the slot as well.

In order to reliably prevent the sealing lips and/or the extension from being squeezed between the walls of the groove and, hence, impairment of the operability of the sealing collar, the width of the groove is preferably larger than the inside width of the sealing collar.

A special advantage of the invention involves that the statically applied sealing lip can have a very elastical design because it no longer has to ensure that the dynamically applied sealing lip is kept at a distance from the slot between the surfaces to be sealed. Therefore, the second sealing lip is preferably configured such that it can be passed over by pressure fluid flow and hence provides the effect of a valve. As regards the dynamically stressed sealing lip this is possible within limits only because this sealing lip must have a relatively robust design.

To maintain sufficient stiffness of the extension, the strength of the extension as a difference between inside and outside diameter has at least the same rate as the strength of each of the sealing lips. This imparts a comparative strength also to the back of the sealing collar so that the sealing lips can generate the necessary radial preload.

As explained hereinabove, the sealing collar of the invention is especially appropriate because it not only seals a pressurized space but additionally is in a position to act as a valve when the direction of the pressure is reversed. However, because the end surface of the extension abuts on the radial groove wall during fluid overflow, the end area at the free end of the extension is provided with radial apertures according to a favorable aspect of the invention, said apertures allowing pressure fluid to pass through in a radial direction. It can be achieved this way that the pressure fluid flowing basically via the statically stressed sealing lip can flow off in a radially inward direction in the area of the groove wall. These apertures may e.g. be bores extending radially through the extension.

Manufacture can be simplified because the apertures in the extension are open in an axial direction towards the free end of the extension. The extension indicated hereinabove as being circumferential will then be decomposed into single extensions being placed on a circumferential circle preferably at an equal distance from each other, the free ends of said extensions being supported on the groove wall. Usually the supporting members connected to a sealing collar are made of a material that is stiffer compared to the material of the sealing collar.

A particularly low-cost design is achieved, however, when the extension is integrally connected to the sealing collar and is preferably made of the same material because the collar herein can be made in one single casting operation without coupling two parts.

BRIEF DESCRIPTION OF THE DRAWING

The foregoing summary of the invention and the following description will be better understood in conjunction with the drawing figure, in which.

DETAILED DESCRIPTION OF THE PREFERRED EMBODIMENT

Figure 1:
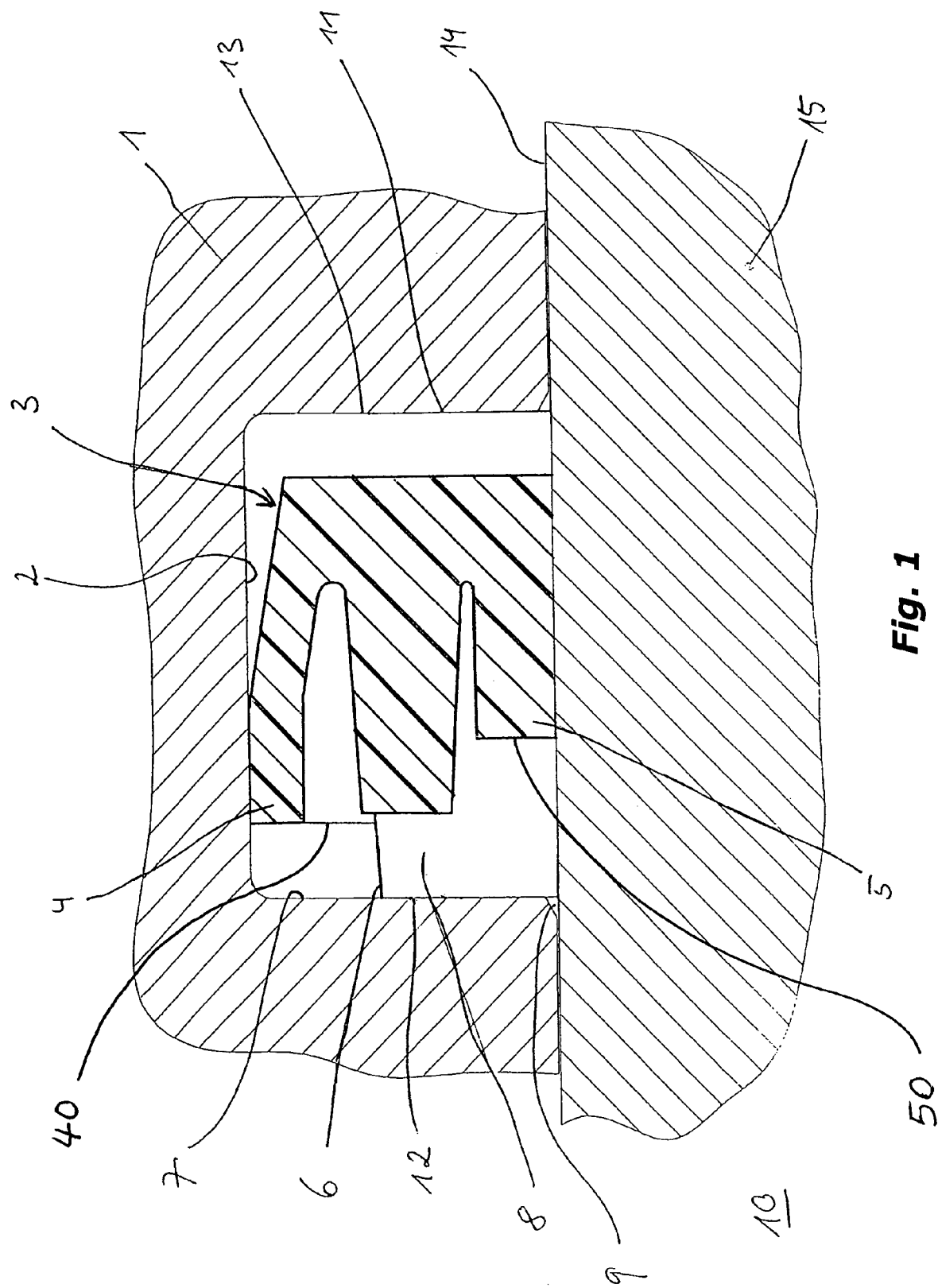
FIG. 1 is a cross-sectional view of a section of a cylinder and piston unit, and a sealing collar accommodated therein.

The drawing shows, in a broken-out and cross-sectional view, a section of the housing of a cylinder 1 of a cylinder-and-piston unit 1, 15, said housing accommodating a sealing collar 3 in a groove 2. Said sealing collar 3 comprises an outside sealing lip 4 disposed radially outwards and an inside sealing lip 5 disposed radially inwards. The outside sealing lip 4 is statically stressed and laterally movable in groove 2 to a small extent only. On the other hand, a peripheral surface 14 of the piston 15, shown in a broken-out fashion, is displaced with respect to the inside sealing lip 5. An extension 6 is arranged radially between the inside sealing lip 5 and the outside sealing lip 4 and abuts with an end surface 12 of its free end on a wall 7 of the groove 2, maintaining the free ends 40, 50 of the two radially offset sealing lips 4, 5 at a distance from the wall 7. The free end of the extension 6 is provided with radial apertures 8 through which pressure fluid can propagate along the wall 7 radially inwards to a slot 9 provided between the housing of the cylinder 1 and the peripheral surface 14 of the piston 15. A corresponding displacement of piston 15 allows pressure fluid to flow from the wall 7 into a space 10 disposed behind piston 15. Fluid flow over the sealing lip 4 is possible when the pressure in an area 11 of groove 2 being disposed on a rear side 13 of the sealing collar 3 is higher than in the area of wall 7.

The invention can be described briefly as follows:

The objective was to find a possibility of preventing the axial abutment of the front surfaces of sealing lips of sealing collars 3, the so-called primary collars, on the groove wall 7 in a master cylinder, for example in a plunger-type construction with stationary sealing elements and plunging pistons. Said abutment of the sealing lips 4, 5 is avoided by the profile of the collar of the invention. Between the two sealing lips 4, 5 extending in an axial direction, the profile of the collar is additionally provided with an extension 6 configured as a supporting rib and projecting over the axial lengths of both the inside sealing lip 5 and the outside sealing lip 4 to a considerable extent. At the free end of this supporting rib 6, there are apertures 8 evenly distributed over the periphery and meant to avoid an inadvertent sealing between the supporting rib 6 and the wall 7 of groove 2 as well as ensuring a sufficiently large flow cross-section.

It is known in the art to support or have the primary collar 3 of a master cylinder abut on the inside sealing lip 5 or the outside sealing lip 4 alternatively. This impairs or prevents a correct functioning of the sealing lips. In particular the flow of pressure fluid over the outside sealing lip 4 at a low fold-over pressure is hardly possible in the event of frontal abutment of the outside sealing lip 4 because the sealing lip 4 is not freely movable. However, said fluid flow over the outside sealing lip 4 is an absolutely necessary function of a primary collar 3 for the purpose of volume compensation.

The advantages of the integrated middle supporting rib 6 in the primary collar 3 are an improved sealing lip function and a lower fold-over pressure of the outside sealing lip 4, especially in the case of volume compensation.

LIST OF REFERENCE NUMERALS 1 cylinder
2 groove
3 sealing collar
4* sealing lip
5 sealing lip
6 extension
7 wall
8 aperture
9 slot
10 space
11 area
12 frontal surface
13 rear side
14 peripheral surface
2** piston Translator's Note:
* the correct reference numeral is '4'
** the correct reference numeral is '15'

The invention claimed is:

1. A cylinder-and-piston unit comprising a cylinder, a piston and a sealing collar, the cylinder comprising a bore, and one of the piston and the cylinder having a wall surface along the bore, the wall surface comprising a first sidewall extending parallel to a longitudinal axis of the bore, a second sidewall contiguous with the first sidewall and extending generally perpendicularly to the first sidewall, a third sidewall contiguous with the second sidewall and extending generally parallel to the first sidewall, a fourth sidewall continuous with the third sidewall and extending generally parallel to the second sidewall, and a fifth sidewall contiguous with the fourth sidewall and extending generally parallel to the first sidewall along the bore, the second, third and fourth sidewalls being parts of one unitary body and bordering a groove that is recessed in the wall surface, the sealing collar being positioned in the groove and comprising an outside sealing lip and an inside sealing lip, the outside and inside sealing lips each having a free end, the sealing collar further including a circumferential extension that extends generally parallel to the sealing lips, is arranged radially between the outside sealing lip and the inside sealing lip and has a free end that projects axially beyond the free ends of the outside and inside sealing lips, the free end of the circumferential extension being provided with radial apertures allowing pressure fluid to pass through in a radial direction, the circumferential extension engaging the second sidewall of the groove and maintaining the free ends of the outside and inside sealing lips out of contact with the second sidewall, wherein the sealing collar includes a rear surface opposite the free ends of the outside and inside sealing lips, wherein the sealing collar has a maximum outside diameter at the free end of the outside sealing lip and a minimum outside diameter at the rear surface.

* * * * *